United States Patent
Toothman, III et al.

(10) Patent No.: US 7,254,666 B2
(45) Date of Patent: Aug. 7, 2007

(54) SYSTEM AND METHOD FOR DELIVERING INFORMATION AT INACCESSIBLE LOCATIONS

(75) Inventors: Glenn R. Toothman, III, Waynesburg, PA (US); Ravinder P. Chandhok, Waynesburg, PA (US); Kimberly H. Chandhok, Waynesburg, PA (US)

(73) Assignee: Memory Medallion, Inc., Waynesburg, PA (US)

( * ) Notice: Subject to any disclaimer, the term of this patent is extended or adjusted under 35 U.S.C. 154(b) by 0 days.

(21) Appl. No.: 09/777,729

(22) Filed: Feb. 6, 2001

(65) Prior Publication Data

US 2002/0026455 A1    Feb. 28, 2002

Related U.S. Application Data

(63) Continuation-in-part of application No. 09/481,577, filed on Jan. 12, 2000.

(51) Int. Cl.
  *G06F 12/00* (2006.01)
(52) U.S. Cl. .................. 711/100; 711/101; 711/102; 711/115; 709/217; 709/218; 709/223; 709/225; 340/572.1; 340/572.4; 340/825.54; 340/572.7; 340/572.8; 340/572.5; 340/505
(58) Field of Classification Search .............. 711/4, 711/100, 101–102, 103, 111, 115, 158, 100.115; 340/572.1, 10.51, 10.52, 933, 539.11, 539.14, 340/568.1, 572.2; 235/462.01, 462.02, 462.45, 235/472.01, 472.02; 345/87, 81; 709/223–225
See application file for complete search history.

(56) References Cited

U.S. PATENT DOCUMENTS 4,498,000 A * 2/1985 Decavele et al. .......... 235/380
4,721,849 A * 1/1988 Davis et al. ............ 235/472.01
4,837,568 A * 6/1989 Snaper ..................... 340/10.52
5,189,291 A * 2/1993 Siemiatkowski ....... 235/462.45

(Continued)

FOREIGN PATENT DOCUMENTS

EP    0 380 727 A    8/1990

(Continued)

*Primary Examiner*—Sanjiv Shah
*Assistant Examiner*—Zhuo H. Li
(74) *Attorney, Agent, or Firm*—Reed Smith LLP (57) ABSTRACT

Systems and methods of using the systems for delivering information related to an inaccessible location to individuals at the inaccessible location are disclosed. The system comprises a memory device affixed to the inaccessible location, the information related to the inaccessible location residing on the memory device, and a portable memory reading device, separate from the memory device, that retrieves the information from the memory device when positioned at the inaccessible location and communicates the information to a party located at the inaccessible location. The system may further comprise a database wherein the information residing on the memory device is replicated and the database can be accessed by a user of the system via a suitable communications medium or combination of mediums. The system may also comprise a portable memory reading device having a GPS receiver positioned at an inaccessible location and a database, such that the GPS coordinates of the inaccessible location are determined by the portable memory reading device and communicated to the database over a communications link, and the database communicates the information related to the inaccessible location back to the portable memory reading device over the communications link.

46 Claims, 4 Drawing Sheets

U.S. PATENT DOCUMENTS

| | | | |
|---|---|---|---|
| 5,613,159 A * | 3/1997 | Colnot | 710/11 |
| 5,635,698 A * | 6/1997 | Terada | 235/462.01 |
| 5,640,164 A | 6/1997 | Gunnarsson | |
| 5,696,488 A * | 12/1997 | Assisi | 340/539.11 |
| 5,992,752 A * | 11/1999 | Wilz et al. | 235/472.01 |
| 6,008,727 A * | 12/1999 | Want et al. | 340/572.1 |
| 6,055,569 A * | 4/2000 | O'Brien et al. | 709/223 |
| 6,131,065 A * | 10/2000 | Marszalek | 701/120 |
| 6,141,663 A * | 10/2000 | Hunkins et al. | 707/201 |
| 6,219,769 B1 * | 4/2001 | Strongin et al. | 711/158 |
| 6,414,663 B1 * | 7/2002 | Manross, Jr. | 345/87 |
| 6,445,309 B1 * | 9/2002 | Walker et al. | 340/933 |
| 6,471,129 B2 * | 10/2002 | Lake | 235/491 |
| 6,611,673 B1 * | 8/2003 | Bayley et al. | 340/10.3 |

FOREIGN PATENT DOCUMENTS

| | | |
|---|---|---|
| JP | 9-154709 A | 6/1997 |
| JP | 11-353307 A | 12/1999 |

\* cited by examiner

SYSTEM AND METHOD FOR DELIVERING INFORMATION AT INACCESSIBLE LOCATIONS

CROSS-REFERENCE TO RELATED APPLICATION

This application is a continuation-in-part of U.S. patent application Ser. No. 09/481,577, filed on Jan. 12, 2000.

BACKGROUND

I. Field of the Invention

The present invention relates generally to the delivery of information, and more particularly to a system and method for delivering information related to an inaccessible location to individuals at the inaccessible location.

II. Description

In common occurrence, many notable locations are physically removed from easily accessible sources of power and/or communication, such as electrical outlets and wireline telephone jacks. This is particularly true in the case of cemeteries, historically significant locations, dedication or donation plaques, and outdoor, as well as some indoor, equipment. Consequently, it is difficult to place information about the notable locations and/or instructions in close proximity thereto and to revise that information once so placed.

In the case of cemeteries, friends and loved ones typically place memorial and/or genealogical information such as name, date born, date passed, notable accomplishments, parents, siblings, children, etc., about the deceased party directly on the tombstone or other graveyard marker. Friends and loved ones also sometimes place photographs of the deceased and/or the family of the deceased on or nearby the tombstone or other graveyard marker that may or may not have been weatherized in some form or another.

In the case of historically notable locations, interested parties typically place signs, placards, photographs, artist's renderings, etc., about the historically notable location, that may or may not have been weatherized, in close proximity to the notable location. Occasionally, interactive tape recordings and/or videos are placed in close proximity to the notable location.

In the case of dedication or donation plaques, interested parties typically place memorial and/or historical information such as name, date of dedication, date of donation, notable accomplishments, etc., about the donating party directly on the plaque or other marker.

In the case of outdoor, and inaccessible indoor, equipment, interested parties typically place manuals, warranties, instructions, etc., about the equipment that may or may not have been weatherized in some form or another, or that may or may not have been treated for extreme indoor conditions, or that may or may not have been, for example, sterilized for certain applications.

In any event, whether the inaccessible location is a cemetery location, historically notable location, dedication or donation plaque, indoor or outdoor equipment, or some other notable but remote or inaccessible location, the need for the information and any equipment necessary for accessing that information to both withstand the weather conditions likely encountered at the location and any attempts to remove them from the location without authorization severely limits both the amount and types of information that may be placed at the remote location with current systems.

Accordingly, there is a need for a system and method of placing and communicating large quantities and varied types of information at inaccessible locations that can withstand the conditions and attempts to remove that information likely to be encountered at the remote location.

SUMMARY OF THE INVENTION

The present invention is directed to a system and method for delivering information related to a remote and/or inaccessible location at the inaccessible location. In one embodiment, the invention comprises a system for providing information related to an inaccessible location comprising a memory device affixed to the inaccessible location, the information residing on the memory device; and a portable memory reading device, separate from the memory device, that retrieves the information from the memory device when positioned at the inaccessible location, wherein the portable memory reading device communicates the information to a party located at the inaccessible location. In another embodiment, the invention comprises a system for providing information related to an inaccessible location comprising a memory device affixed to a physical object at the inaccessible location, the information residing on the memory device; a portable memory reading device, separate from the memory device, that retrieves the information from the memory device when positioned at the inaccessible location and communicates the information to a party located at the inaccessible location; and a database wherein the information residing on the memory device is replicated; and wherein the memory device is uniquely associated with an identifying code.

In yet another embodiment, the invention comprises a system for providing historical information about a historically notable location comprising a memory device affixed to a physical object positioned at the historically notable location, the historical information residing on the memory device; and a portable memory reading device, separate from the memory device, that retrieves the historical information from the memory device when positioned at the historically notable location and communicates the historical information to a party located at the historically notable location. In a still further embodiment, the invention comprises a system for providing memorial information about a deceased party interred at a cemetery location comprising a memory device affixed to a physical object positioned at the cemetery location, the memorial information residing on the memory device; and a portable memory reading device, separate from the memory device, that retrieves the memorial information from the memory device when positioned at the cemetery location and communicates the memorial information to a party located at the cemetery location.

In yet another embodiment of the invention, the invention comprises a system for providing dedication or donation information for a substantially complete explanation about the reasons for the gift at any location, such as a hospital, comprising a memory device affixed to a physical object positioned at the location, the dedication or donation information residing on the memory device; and a portable memory reading device, separate from the memory device, that retrieves the dedication or donation information from the memory device when positioned at the location and communicates the dedication or donation information to a party located at the location. In a still further embodiment, the invention comprises a system for providing instructions, manuals, and/or warranty information about indoor or outdoor equipment, such as a lawn tractor, at any location, comprising a memory device affixed to the equipment positioned at any location, the instructions, manuals, and/or warranty information residing on the memory device; and a portable memory reading device, separate from the memory device, that retrieves the instructions, manuals, and/or warranty information from the memory device when positioned at the location and communicates the instructions, manuals, and/or warranty information to a party located at the location.

In yet another embodiment of the invention, the invention comprises a method for providing information related to an inaccessible location, comprising the steps of storing the information on a memory device, the information being stored in a format that can be retrieved from the memory device and displayed to a party with a portable memory reading device, separate from the memory device, when the portable memory reading device is in close proximity to the memory device; and affixing the memory device to a physical object positioned at the inaccessible location. Additional steps in the method may include replicating the information stored on the memory device in a database; revising the replicated information at the database, and communicating the revised replicated information to the memory device over a communicable connection between the database and the memory device; and/or providing the replicated information over a communications medium upon receipt by the database of an identifying code, the identifying code being uniquely associated with the memory device having the information stored thereon.

Therefore, the present invention provides a system and method of placing and communicating large quantities and varied types of information at inaccessible locations, that can withstand the conditions and attempts to remove that information likely to be encountered at the inaccessible location.

BRIEF DESCRIPTION OF THE DRAWINGS

The features, objects and advantages of the present invention will become more apparent from the detailed description set forth below when taken in conjunction with the drawings, in which like reference characters identify corresponding elements throughout, and wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical information delivery system. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
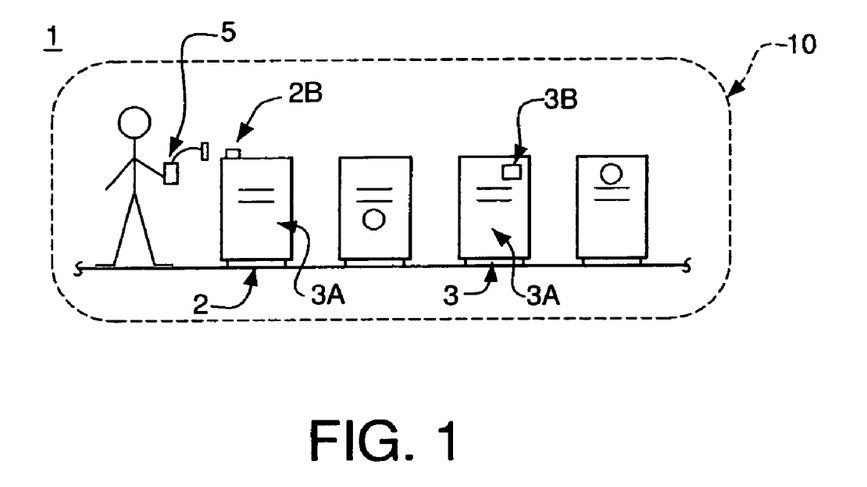
FIG. 1 is a block diagram of a system for providing information related to an inaccessible location in accordance with a first preferred embodiment of the invention.

Referring to FIG. 1, there is shown a block diagram of an information generator 1 for providing information related to inaccessible locations in accordance with preferred embodiments of the invention. A number of locations 2–3 in a cemetery 10 have memory devices 2B–3B permanently affixed to tombstones 2A–3A at locations 2–3 respectively. Cemetery 10 may comprise a catacomb, cinerarium, crypt, mausoleum, ossuary, sepulcher, tomb, vault, or any other location where a deceased party may be laid to rest either temporarily or permanently. A deceased party may comprise any living organism that has passed, including but not limited to human beings that have passed. Tombstones 2A–3A may comprise any type of physical object used to mark the locations 2–3 of deceased parties within cemetery 10. Memory devices 2B–3B have memorial and/or genealogical information about the deceased party interred at locations 2–3 stored therein or thereon. This information may comprise any information related to the deceased party that a friend or loved one may find interesting including, but not limited to the name, date born, date passed, notable accomplishments, parents, siblings, children, etc., of the deceased party as well as photographic and artistic images of or relating to the deceased party.

In preferred embodiments of the invention, memory devices 2B–3B comprise contact memory devices, and each memory device may be uniquely associated with an identifying code. Contact memories generically comprise physical devices that attach directly to an object and can be read through active or passive contact with a reading device. Typically contact memories are approximately the size of a clothing button, and comprise a stainless steel container housing a small memory chip inside. Information can usually be written to the contact memory through temporary active or passive contact with the contact memory as well. In preferred embodiments of the invention, memory devices 2B–3B comprise an iButton® contact memory device, the mechanical and technical standards for which are available at http://www.ibuttom.com/ibuttons/standard.pdf, and are incorporated herein by reference. Memory devices 2B–3B may also comprise, in addition to contact memories, read only memory (ROM) devices, electronically erasable programmable read only memory (EEPROM) devices, electronically programmable read only memory (EPROM) devices, random access memory (RAM) devices, static random access memory (SRAM) devices, static bar codes, or any other device that is small in size, can be easily and permanently attached to a physical object, can store large quantities and varied types of information, and can withstand extreme weather conditions without losing or damaging the information stored therein and/or thereon. The information is stored in and/or on the memory device in a format suitable for the type of memory device used, extensible markup language or hypertext markup language comprising the preferred format.

Referring still to FIG. 1, system 1 further comprises a portable memory reading device 5. Portable memory reading device 5 may comprise a special purpose computer, a portable general purpose computer such as a laptop computer, or any other type of portable computerized device, including a hand-held portable computer, a wireless communications device, and/or a smart wireless communications device, that has the ability to read, receive, and/or display all or a portion of the information stored on memory devices 2B–3B when placed at locations 2–3 or in close proximity to memory devices 2B–3B. Typically, portable memory reading device 5 will have an integrated means of reading, receiving, and/or writing information from or to memory devices 2B–3B. In other cases, portable memory reading device 5 may have a hand-held probe attached thereto through some type of serial and/or parallel electrical connection for reading, receiving, and/or writing information from and/or to memory devices 2B–3B. The precise means of reading, receiving, and/or writing of the information employed is a matter of design choice and will necessarily depend on the type of memory device 2B–3B employed. Where the memory devices 2B–3B employed are contact memories, a preferred means of reading and/or writing comprises a single signal plus ground probe, whether integrated or hand-held, configured to an input/output line of a microcomputer.

Figure 2:
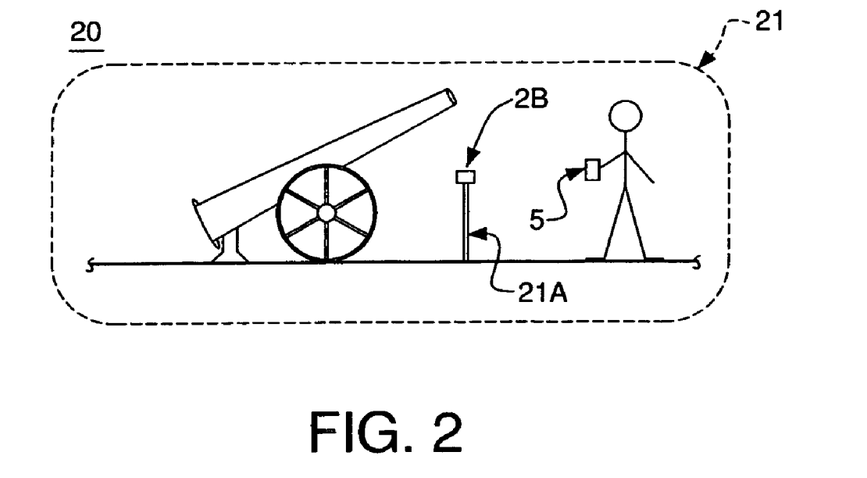
FIG. 2 is a block diagram of a system for providing information related to an inaccessible location in accordance with a second preferred embodiment of the invention.

Referring now to FIG. 2, there is shown a block diagram of a system 20 for providing information related to an inaccessible location 21 in accordance with a second preferred embodiment of the invention. System 20 comprises a memory device 2B permanently affixed to post 21A located at historically notable location 21, and portable memory reading device 5. Memory device 2B and portable memory reading device 5 comprise the same elements as in system 1 described above, except that the information stored in and/or on memory device 2B comprises historical information about historically notable location 21. Post 21A comprises a stake anchored to the ground at historically notable location 21, but may also comprise a sign, lamppost, doorframe, fencepost, cannon, or any other physical object, whether stationary or movable and whether permanent or temporary, located at or near historically notable location 21. Historically notable location 21 comprises any location physically removed from convenient access to electrical and/or wireline telephone service that a person may find historically interesting because of events that have occurred, are occurring, or may be occurring in the future, and historically notable information comprises any information about the events that have occurred, are occurring, or may be occurring at inaccessible location 21 in the future.

Figure 3:
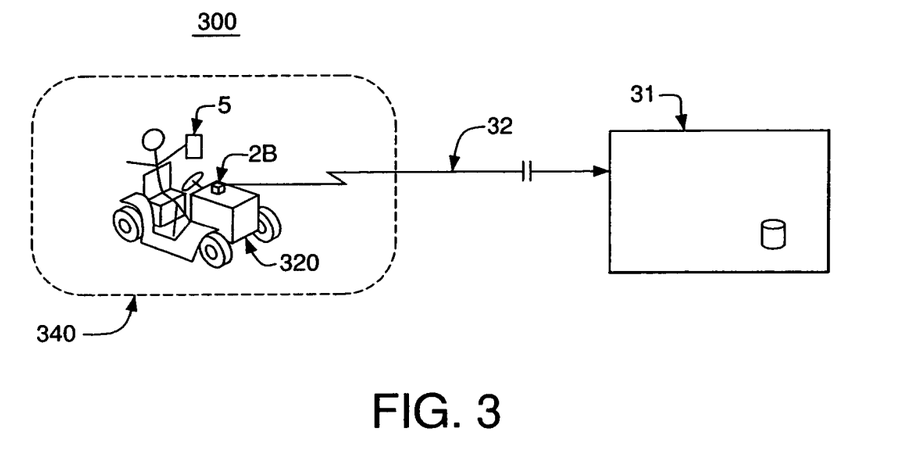
FIG. 3 is a block diagram of a system for providing information related to an inaccessible location in accordance with a third preferred embodiment of the invention.

Referring now to FIG. 3, there is shown a block diagram of a system 300 for providing information related to an inaccessible location 340 in accordance with a third preferred embodiment of the invention. An inaccessible location is a location that cannot easily be wired for electricity and/or electronic communication. System 300 comprises a memory device 2B affixed, such as permanently affixed, to equipment 320, such as an automobile or a lawn tractor, or indoor equipment, such as a television or a stereo, located at any inaccessible location 340, and portable memory reading device 5. Memory device 2B and portable memory reading device 5 preferably comprise the same elements as in system 1 described above, except that the information stored in and/or on memory device 2B includes, but is not limited to, instructions, such as manuals, and/or warranty information, about the equipment 320. As shown, equipment 320 comprises, for example, outdoor equipment in the form of a lawn tractor at location 340, but may also comprise, for example, snow blowers, mulchers, tillers, or any other physical object, whether stationary or movable, and whether permanent or temporary, located at or near location 340. Location 340 comprises any location physically removed from convenient access to electrical and/or wireline telephone service, and instructions, manuals, and/or warranty information comprises any information about the equipment at inaccessible location 340.

Figure 4:
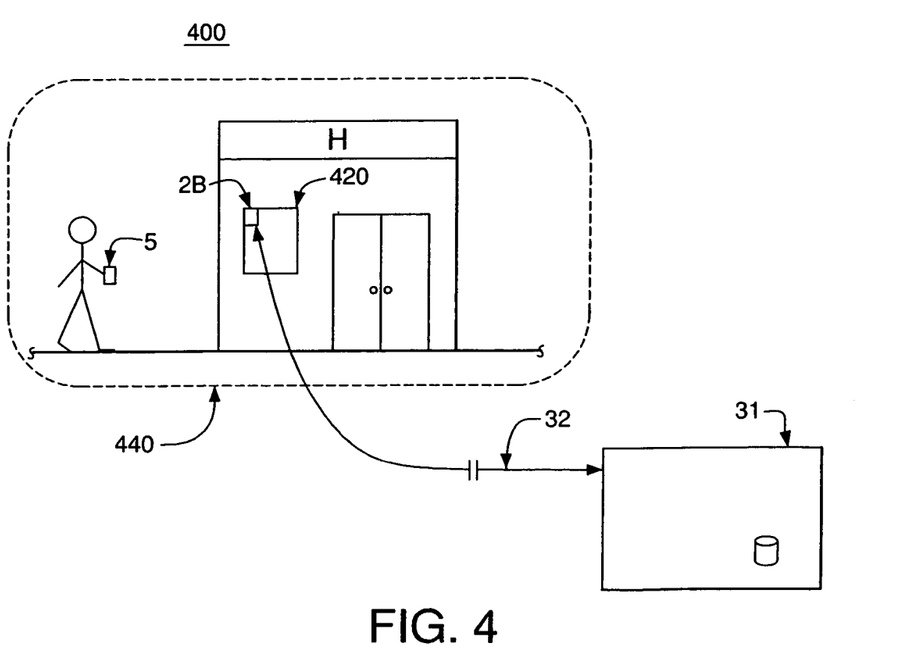
FIG. 4 is a block diagram of a system for providing information related to an inaccessible location in accordance with a fourth embodiment of the invention.

Referring now to FIG. 4, there is shown a block diagram of a system 400 for providing information related to an inaccessible location 440 in accordance with a fourth preferred embodiment of the invention. System 400 comprises a memory device 2B affixed, such as permanently affixed, proximate to, i.e. on or near, a dedication or donation plaque 420 or art piece 420 located at any inaccessible location 440, and portable memory reading device 5. As used herein, plaque includes any device, item, piece, or mechanism capable of signifying, for example, a donor's donation, and, as used herein, a dedication or donation would include the generator of the dedication, such as the painter of a painting, or the donator of a painting. Memory device 2B and portable memory reading device 5 comprise the same elements as in system 1 described above, except that the information stored in and/or on memory device 2B comprises dedication or donation information, including a substantially complete story about why the gift was given by the donating party to location 440, such as a hospital, or how a gift was created, such as the artist who created artwork. A dedication or donation plaque 420 comprises a sign at location 440 as illustrated, but may also comprise a photograph, engraving, drawing, painting, or any other physical object, whether stationary or movable and whether permanent or temporary, located at or near location 440. Location 440 comprises any location physically removed from convenient access to electrical and/or wireline telephone service, and dedication or donation information comprises any information about the donating party at inaccessible location 440.

Figure 5:
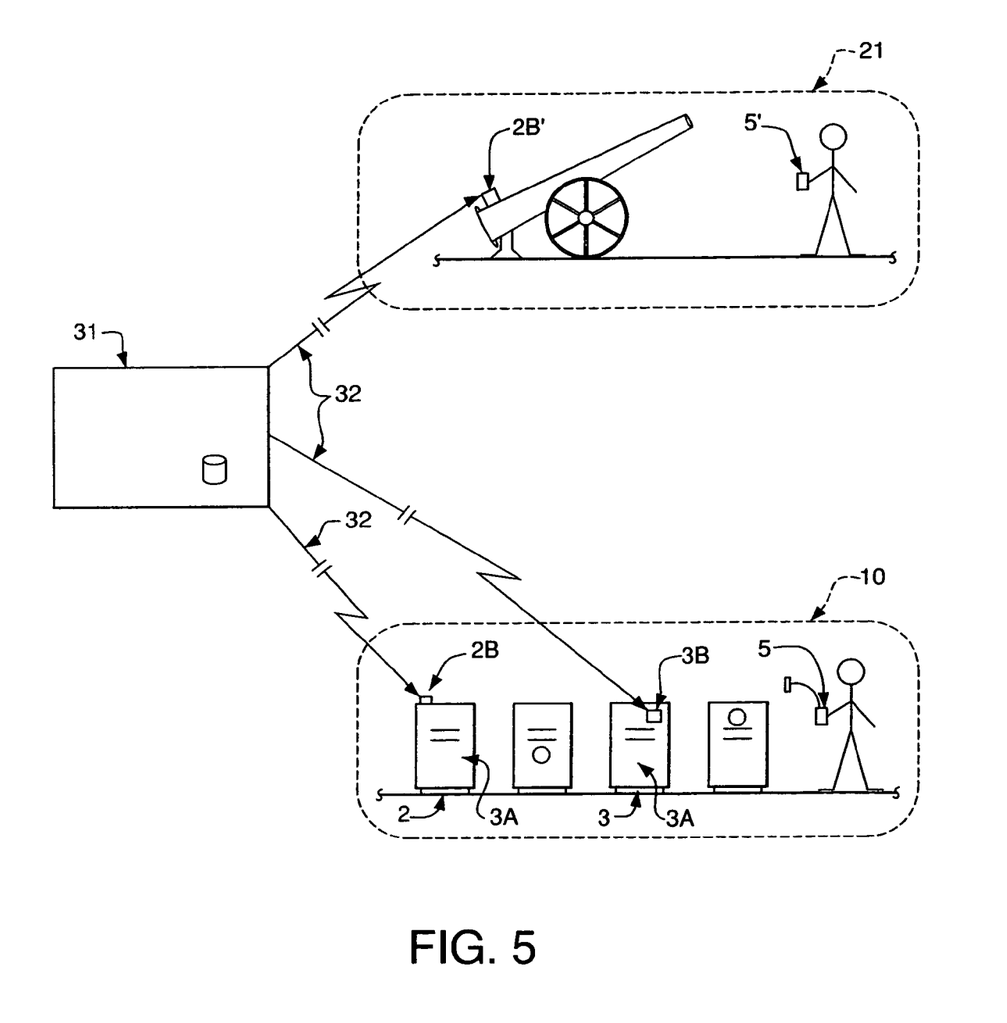
FIG. 5 is a block diagram of a system for providing information related to an inaccessible location in accordance with a fifth embodiment of the invention.

Referring now to FIG. 5, there is shown a block diagram of a system 30 for providing information related to an inaccessible location 21 in accordance with a fifth preferred embodiment of the invention. System 30 comprises memory device 2B, 3B, and 2B' permanently affixed to tombstones 2A and 3B and post 21A respectively, tombstones 2A–3A located in cemetery 10 and post 21A located at historically notable location 21, portable memory reading devices 5 and 5', and database 31 communicably connected 32 to memory devices 2B, 3B, and 2B'. Memory devices 2B, 3B, and 2B', tombstones 2A–3A, post 21A, historically notable location 21, and portable memory reading devices 5 and 5' comprise the same elements as in systems 1 and/or 20 described above. Database 31 comprises a single or central database wherein the information stored in and/or on memory devices 2B, 3B, and/or 2B' is replicated in whole or in part, or a plurality of distributed databases wherein the information stored in and/or on memory devices 2B, 3B, and/or 2B' is replicated in whole or in part.

Referring back to FIG. 3, there is shown a block diagram of a system 300 for providing information related to an inaccessible location 340. System 300 may comprise memory device 2B permanently affixed to equipment 320, such as a lawn tractor, portable memory reading devices 5, and database 31 communicatively connected 32 to memory reading device 5. Memory device 2B, equipment 320, location 340, and portable memory reading device 5 comprise the same elements as in the systems described hereinabove. Database 31 comprises a single or central database wherein the information stored in and/or on memory device 2B is replicated in whole or in part, or a plurality of distributed databases wherein the information stored in and/or on memory devices 2B is replicated in whole or in part.

Referring now to FIG. 4, there is shown a block diagram of a system 400 for providing information related to an inaccessible location 440. System 400 may comprise memory device 2B permanently affixed to plaque 420, plaque 420 located in an inaccessible location 440, such as a hospital or any other building, portable memory reading device 5, and database 31 communicatively connected 32 to memory device 2B. Memory device 2B, plaque 420, inaccessible location 440, and portable memory reading device 5 comprise the same elements as in the systems described hereinabove. Database 31 comprises a single or central database wherein the information stored in and/or on memory device 2B is replicated in whole or in part, or a plurality of distributed databases wherein the information stored in and/or on memory device 2B is replicated in whole or in part.

In the case where database 31 comprises a plurality of distributed databases, the plurality of databases may be connected to one another via an internet connection, limited or wide area network connection, or some other type of suitable communicable connection or combination of connections as would be known in the art, and the information stored in and/or on memory devices 2B, 3B, and/or 2B' may be replicated on each or some lesser number of the databases in the plurality. The communicable connection 32 to memory devices 2B, 3B, and/or 2B' may comprise an internet connection, a limited and/or wide area network connection, a wireless communications connection, a wireline telephone connection, or some other type of suitable communicable connection or combination of connections as would be known in the art. The replicated information residing on database 31 may be revised at database 31 and the revised replicated information communicated to memory devices 2B, 3B, and/or 2B' over communicable connection 32.

In certain embodiments of the invention in system 30, 300, and 400, communicative connection 32 need not comprise a permanent communicative connection, as in the case where the information residing on memory devices 2B, 3B, and/or 2B' may be overwritten with portable memory reading device 5 and/or 5'. In those embodiments, revised replicated information may be transferred from database 31 to portable memory reading device 5 and/or 5' over a suitable connection and subsequently read to memory devices 2B, 3B, and/or 2B' when memory reading device 5 and/or 5' is placed in close proximity to memory devices 2B, 3B, and/or 2B'.

In still further embodiments of system 30, 300, and 400, users of the system may utilize the identifying codes that are uniquely associated with memory devices 2B, 3B, and/or 3B' to access the replicated information residing on database 31 either with or without the use of memory reading device 5 and/or 5', depending on the type of devices employed as memory reading device 5 and/or 5'. A user of the system accesses database 31 through an internet with a browser or some other suitable form of software, a telephone connection, including wireless telephone connections, or any other type of suitable communications medium or combination of mediums as would be known in the art, provides the identifying code for the inaccessible location 2, 3, and/or 21 he or she is interested in receiving information about, and database 31 provides the replicated information corresponding to inaccessible location 2, 3, and/or 21 to the user over the communication medium employed upon receipt of the identifying code.

Figure 6:
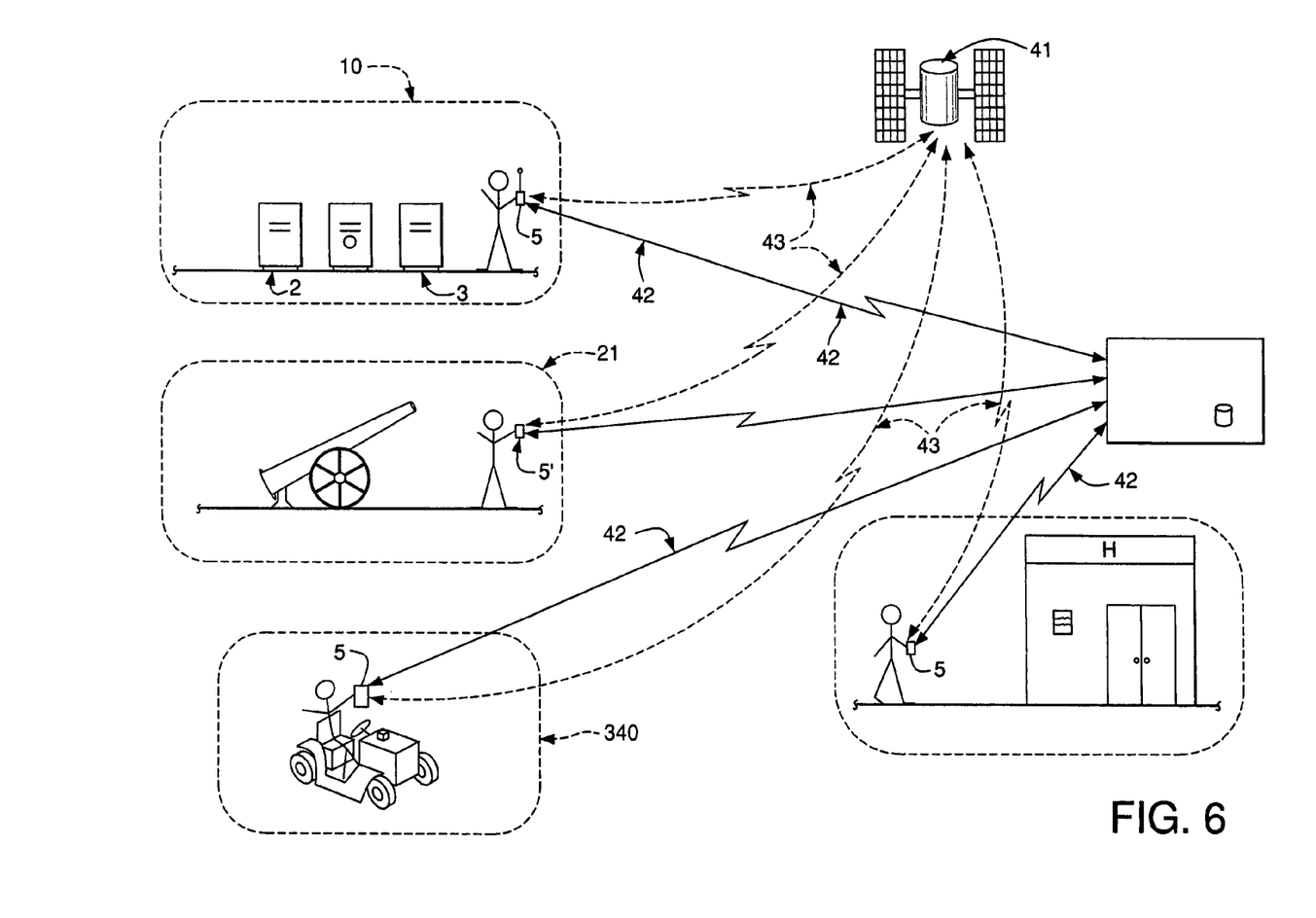
FIG. 6 is a block diagram of a system for providing information related to an inaccessible location in accordance with a sixth embodiment of the invention.

Referring now to FIG. 6, there is shown a block diagram of a system 40 for providing information relate to inaccessible locations in accordance with a sixth embodiment of the invention. System 40 comprises locations 2 and 3 within cemetery 10, historically notable location 21, plaque location 440, equipment location 340, memory reading devices 5 and 5', database 32, communication links 42 between memory reading devices 5 and 5' and database 32, the Global Positioning System (GPS) infrastructure 41, and GPS signals 43. Locations 2 and 3, cemetery 10, historically notable location 21, plaque location 440, equipment location 340, memory reading devices 5 and 5', and database 32 comprise the same elements as in systems 1, 20, and/or 30 described above. In system 40 though, memory reading devices 5 and 5' also comprise GPS receivers, and preferably wireless communications devices or smart wireless communications devices with GPS receivers integrated therein. Communication links 42 comprise the same types of connections a user would employ to access database 32 in system 30, 300, and 400. When memory reading device 5 or 5' is positioned near cemetery location 2 or 3, historically notable location 21, plaque location 440, or equipment location 340, memory reading device 5 or 5' determines its position on the surface of the earth through the use of GPS signals 43 transmitted by GPS system infrastructure 41, accesses database 32 via communication links 42, and communicates its GPS position to database 32. Database 32 determines the inaccessible location associated with the GPS position received from memory reading device 5 or 5' via communication links 42, in this case cemetery location 2 or 3 or historical location 21, and communicates the information related to inaccessible locations 2, 3, and/or 21 to memory reading device 5 or 5' over communication links 42. The information may then be displayed or communicated to a user of system 40 located at or near inaccessible location 2, 3, and/or 21. In some embodiments of the invention, a user of system 40 may be required to initiate access to database 32 over communication links 42, and/or may be required to provide an identification number, code or password before the information related to inaccessible location 2, 3, and/or 21 can be accessed by and/or communicated to memory reading device 5 or 5'.

In any embodiment of the invention, including the embodiments shown and described above, the information related to an inaccessible location may also comprise, in addition to information specifically related to the inaccessible location, data, symbols, codes, and/or other information not specifically related to the inaccessible location that may be used to access the information specifically related to the inaccessible location, whether resident on a memory device at an inaccessible location or a database located somewhere other than the inaccessible location. Moreover, the inaccessible locations where the invention may be employed are not limited to cemetery and historically notable locations, but may comprise any location that a person may find notable that is physically removed from easily accessible sources of power and communication, regardless of whether the climatic conditions likely encountered would be considered extreme. Thus, systems and methods for providing information related to an inaccessible location have been shown and described. Users of the systems and methods have the ability among other things to store, receive, and/or revise the information related to the inaccessible location in a number of ways.

The foregoing description of the preferred embodiments is provided to enable any person skilled in the art to make or use the present invention. Various modifications to the embodiments described above however will be readily apparent to those skilled in the art, and the generic principles defined herein may be applied to other embodiments without the use of inventive faculty. Thus, the present invention is not intended to be limited to the specific systems and methods shown herein but is to be accorded the widest scope consistent with the claims set forth below.

That which is claimed:

1. A system for providing instructions directly relating to individual ones of a plurality of substantially immovable equipment, each at a substantially inaccessible location, comprising:
   (A) a plurality of permanently spatially fixed processors and memory devices, wherein at least one permanently spatially fixed processor and memory device is affixed to each of the individual ones of the plurality of substantially immovable equipment, the instructions residing on each memory device uniquely and directly relating to each one of the substantially immovable equipment to which the memory device is affixed; and
   (B) a portable memory reading device, separate from the memory device, capable of uploading and downloading the instructions to and from multiple ones of the plurality of memory devices, via a non-permanent wireless proximity link, while the plurality of processors and memory devices are affixed to their respective substantially immovable equipment, and communicating received ones of the instructions to a user of said portable memory reading device,
   wherein each of said plurality of processors processes the instructions to and from said memory device, including processing for forwarding of the instructions from the associated memory device to said memory reading device.

2. The system of claim 1, wherein at least one of the plurality of memory devices comprises a contact memory device.

3. The system of claim 1, wherein at least one of the plurality of memory devices comprises a programmable read only memory device.

4. The system of claim 1, wherein at least one of the plurality of memory devices comprises a weather resistant memory device.

5. The system of claim 1, wherein the information resides on at least one of the plurality of memory devices in extensible markup language format.

6. The system of claim 1, wherein the information resides on at least one of the plurality of memory devices in hypertext markup language format.

7. The system of claim 1, wherein at least one of the plurality of substantially immovable equipment is outdoor equipment.

8. The system of claim 1, wherein at least one of the plurality of substantially immovable equipment is indoor equipment.

9. The system of claim 1, further comprising:
   (C) a database associated with at least one of the plurality of memory devices, wherein the information on each memory device is replicated; and
   wherein each memory device is uniquely associated with an identifying code.

10. The system of claim 9, wherein the replicated information is accessed upon receipt of the identifying code by the database.

11. The system of claim 10, wherein the replicated information is accessed through an internet.

12. The system of claim 10, wherein the replicated information is accessed through a telephone network.

13. The system of claim 9, wherein the database is communicatively connected to selected ones of the plurality of memory devices.

14. The system of claim 13, wherein the replicated information is revised at the database, and wherein the revised replicated information is communicated from the database to selected ones of the plurality of memory devices via the communicative connection.

15. A system for providing information directly relating to individual ones of a plurality of substantially immovable dedications each at a substantially inaccessible location, the information including details concerning reasons for individual ones of the dedications, comprising:
   (A) a plurality of permanently spatially fixed processors and memory devices, wherein at least one permanently spatially fixed processor and memory device is affixed proximate to each of the individual ones of the plurality of substantially immovable dedications, the information uniquely and directly relating to each one of the substantially immovable dedications to which the memory device is affixed; and
   (B) a portable memory reading device, separate from the plurality of memory devices, capable of uploading and downloading the dedication information to and from individual ones of the memory devices, via a non-permanent wireless proximity link while the associated processor and memory device are affixed proximate to the associated substantially immovable dedication, and communicating received ones of the dedication information to a user of said portable memory reading device,
   wherein each of said processors processes the information to and from the associated memory device, including processing for forwarding of the information from the associated memory device to said memory reading device.

16. The system of claim 15, wherein at least one of the plurality of memory devices comprises a contact memory device.

17. The system of claim 15, wherein at least one of the plurality of memory devices comprises a programmable read only memory device.

18. The system of claim 15, wherein at least one of the plurality of memory devices comprises a weather resistant memory device.

19. The system of claim 15, wherein the information resides on at least one of the plurality of memory devices in extensible markup language format.

20. The system of claim 15, wherein said information resides on at least one of the plurality of memory devices in hypertext markup language format.

21. The system of claim 15, further comprising:
   (C) a database wherein the information residing on ones of the plurality of memory devices is replicated; and
   wherein at least one of the plurality of memory devices is uniquely associated with an identifying code.

22. The system of claim 21, wherein the replicated information is capable of being accessed upon receipt of the identifying code by the database.

23. The system of claim 22, wherein the replicated information is accessed through an internet.

24. The system of claim 22, wherein the replicated information is accessed through a telephone network.

25. The system of claim 21, wherein the database is communicatively connected to at least one of the plurality of memory devices.

26. The system of claim 25, wherein the replicated information is revised at the database, and wherein the revised replicated information is communicated from the database to at least one of the plurality of memory devices via the communicative connection.

27. An information generator for use at a plurality of substantially inaccessible locations, comprising:

a plurality of permanently spatially fixed processors and memory devices, wherein at least one permanently spatially fixed processor and memory device is affixed at least one of the plurality of substantially inaccessible locations, wherein each associated memory device includes thereon a plurality of information uniquely and directly related to the associated substantially inaccessible location;

a portable memory reading device, wherein said portable memory reading device is physically separate from each of said plurality of memory devices, wherein said portable memory reading device is capable of being communicatively connected to multiple ones of said plurality of memory devices, via a non-permanent wireless proximity link while the associated processor and memory device are affixed at the associated substantially inaccessible location; and wherein, said portable memory reading device is capable of loading the plurality of information directly related to the associated substantially inaccessible location onto the associated memory device, and wherein, upon establishing a communicative connection with said associated memory device at a request of at least one user, said portable memory reading device receives the plurality of information uniquely and directly related to the associated substantially inaccessible location for display to the user, and wherein said associated processor processes the information to and from said associated memory device, including processing for forwarding of the information from the associated memory device to said memory reading device.

28. The information generator of claim 27, wherein at least one of the plurality of memory devices comprises a contact memory device.

29. The information generator of claim 28, wherein at least one of the plurality of memory devices comprises a programmable read only memory device.

30. The information generator of claim 28, wherein at least one of the plurality of memory devices comprises a weather resistant memory device.

31. The information generator of claim 27, wherein the information resides on at least one of the plurality of memory devices in extensible markup language format.

32. The information generator of claim 27, wherein the information resides on at least one of the plurality of memory devices in hypertext markup language format.

33. The information generator of claim 27, further comprising:
(C) a database wherein the information residing on at least one of the plurality of memory devices is replicated; and
wherein said at least one of the plurality of memory devices is uniquely associated with an identifying code.

34. The information generator of claim 33, wherein the replicated information may be accessed upon receipt of the identifying code by the database.

35. The information generator of claim 34, wherein the replicated information is accessed through an internet.

36. The information generator of claim 34, wherein the replicated information is accessed through a telephone network.

37. The information generator of claim 33, wherein the database is communicatively connected to at least one of the plurality of memory devices.

38. The information generator of claim 37, wherein the replicated information may be revised at the database, and wherein the revised replicated information is capable of being communicated from the database to at least one of the plurality of memory devices via the communicable connection.

39. A method for providing information related to individual ones of a plurality of substantially inaccessible locations, wherein individual ones of the plurality of substantially inaccessible locations is at least one selected from the group consisting of a cemetery site, a dedication site, an equipment site, and a historically notable site, comprising:

(A) storing and retrieving the information directly related to individual ones of the plurality of substantially inaccessible locations on a permanently spatially fixed processor and memory device uniquely and directly associated with the individual locations in a format that can be written to and retrieved from multiple ones of the memory devices each associated with the individual ones of the plurality of substantially inaccessible locations at different points in time by a user of a single portable memory reading device separate from the associated memory devices, via a non-permanent wireless proximity link, while each processor and memory device are permanently spatially fixed, and wherein the information is displayed to a user using the portable memory reading device upon request of the user while in proximity of individual ones of the processors and memory devices; and (B) substantially immovably affixing each of the plurality of memory devices at individual ones of the plurality of inaccessible locations, wherein each of said processors processes the information to and from the associated memory device, including processing for forwarding of the information from at least one of the plurality of memory devices to said memory reading device.

40. The method of claim 39, comprising the additional step of:
(C) replicating the information stored on at least one of the plurality of memory devices in a database.

41. The method of claim 40, comprising the additional step of:
(D) revising the replicated information at the database, and communicating the revised replicated information to at least one of the plurality of memory devices over a communicable connection between the database and at least one of the plurality of memory devices.

42. The method of claim 40, comprising the additional step of:
(E) providing the replicated information over a communication medium upon receipt by the database of an identifying code, the identifying code being uniquely associated with at least one of the plurality of memory devices having the information stored thereon.

43. The method of claim 39, wherein the information comprises memorial information.

44. The method of claim 39, wherein the information comprises historical information.

45. The method of claim 39, wherein the information comprises reasons for the dedication.

46. The method of claim 39, wherein the information is at least one selected from the group consisting of a user's manual, operation instructions, and warranties.

* * * * *